United States Patent
Williams et al.

(10) Patent No.: US 10,216,245 B2
(45) Date of Patent: Feb. 26, 2019

(54) APPLICATION RAMP RATE CONTROL IN LARGE INSTALLATIONS

(71) Applicant: Cray Inc., Seattle, WA (US)

(72) Inventors: Josh Williams, Chippewa Falls, WI (US); Steve Martin, Chippewa Falls, WI (US); Clark Snyder, Chippewa Falls, WI (US); David Rush, Chippewa Falls, WI (US); Matthew Kappel, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 188 days.

(21) Appl. No.: 14/978,990

(22) Filed: Dec. 22, 2015

(65) Prior Publication Data

US 2017/0177070 A1  Jun. 22, 2017

(51) Int. Cl.

| | |
|---|---|
| *G06F 1/00* | (2006.01) |
| *G06F 1/26* | (2006.01) |
| *G06F 1/3228* | (2019.01) |
| *G06F 1/329* | (2019.01) |
| *G06F 9/50* | (2006.01) |

(52) U.S. Cl.
CPC ............ *G06F 1/3228* (2013.01); *G06F 1/329* (2013.01); *G06F 9/5094* (2013.01); *Y02D 10/24* (2018.01)

(58) Field of Classification Search
CPC ....................................................... G06F 1/32
See application file for complete search history.

(56) References Cited

U.S. PATENT DOCUMENTS

| 7,281,149 B2 * | 10/2007 | Atkinson | ............. G06F 1/3203 713/323 |
| 7,342,370 B2 * | 3/2008 | Greene | ............... B60N 2/0232 318/139 |

(Continued)

FOREIGN PATENT DOCUMENTS

| CN | 102609311 B | 12/2014 |
| EP | 2075666 A2 | 7/2009 |

(Continued)

*Primary Examiner* — Mohammed H Rehman
(74) *Attorney, Agent, or Firm* — Craig J. Lervick; Larkin Hoffman Daly & Lindgren, Ltd.

(57) ABSTRACT

To eliminate the adverse effects of power swings in a large scale computing system during the life cycle of an application or job, control of several operating characteristics for the collective group of processors is provided. By providing certain levels of coordination for the many processors utilized in large scale computing systems, significant and abrupt changes in power needs can be avoided. In certain circumstances, this may involve limiting the transition between several C-States of the processors involved and the overall power transitions for a large scale system are not detrimental and do not create issues for the data center or local power utility. Some cases will require stepped transitions between C-States, while other cases will include both stepped and modulated transitions. Other cases will incorporate random wait times at the various transitions in order to spread the power consumption involved. In yet further circumstances the C-States can be pinned to a specific setting, thus avoiding transitions caused by C-State transitions. To deal with further issues, the processor P-States can also be overridden.

18 Claims, 3 Drawing Sheets

(56) References Cited

U.S. PATENT DOCUMENTS

| | | | |
|---|---|---|---|
| 7,573,252 B1* | 8/2009 | Griesert | G05F 3/262 |
| | | | 323/315 |
| 8,069,359 B2 | 11/2011 | Tolentino | |
| 8,301,925 B2 | 10/2012 | Tolentino | |
| 8,347,119 B2 | 1/2013 | Song | |
| 8,635,476 B2 | 1/2014 | Henry et al. | |
| 8,813,080 B2 | 8/2014 | Fenger et al. | |
| 8,954,977 B2 | 2/2015 | Song | |
| 2002/0109489 A1* | 8/2002 | Shaver | G06F 1/26 |
| | | | 323/283 |
| 2004/0022078 A1* | 2/2004 | Shieh | H02M 1/36 |
| | | | 363/49 |
| 2007/0005995 A1 | 1/2007 | Kardach et al. | |
| 2009/0007120 A1 | 1/2009 | Fenger et al. | |
| 2009/0171511 A1 | 7/2009 | Tolentino | |
| 2010/0146513 A1 | 6/2010 | Song | |
| 2010/0332856 A1 | 12/2010 | Song | |
| 2012/0036377 A1 | 2/2012 | Tolentino | |
| 2012/0268028 A1* | 10/2012 | Kumada | H02H 9/002 |
| | | | 315/226 |
| 2015/0039922 A1 | 2/2015 | Chalhoub et al. | |
| 2016/0165695 A1* | 6/2016 | Gershowitz | H05B 33/0803 |
| | | | 315/297 |
| 2016/0181814 A1* | 6/2016 | Huang | G06F 1/26 |
| | | | 307/24 |

FOREIGN PATENT DOCUMENTS

| | | | |
|---|---|---|---|
| EP | 2207092 A2 | 7/2010 | |
| EP | 2270625 A1 | 1/2011 | |
| WO | 2004051461 A3 | 6/2004 | |

\* cited by examiner

APPLICATION RAMP RATE CONTROL IN LARGE INSTALLATIONS

BACKGROUND

In large scale computing systems, the operations and activities of the system as a whole can potentially create various undesired effects. For example, the simultaneous start of many different nodes in such a system can create an undesired spike in power needed to carry out operations. Further, during an application run, huge swings in overall power consumption can be observed. Due to the cumulative effect of multiple components or nodes of a large scale system operating simultaneously, the magnitude of these swings can be severe enough to cause a variety of issues and concerns.

Typically, prior to the launch of a computing application, the assigned compute nodes are idle. In most situations, idle nodes have been tuned to consume as little power as possible. At launch however, these nodes go from minimal power consumption to maximum power consumption, nearly instantaneously. In large installations, with many nodes and a wide variety of applications, the magnitude of this sudden increase in power over a short period of time can create a heavy drain on the power source. In some extreme cases this large need for instantaneous power to support a large application launch can potentially lead to system failure. In certain facilities and/or sites, the system operator may also be contractually obligated to minimize their rate of change in power consumption over time, in order to allow their service provider to maintain a certain quality of service for all of its customers. The above mentioned spike of power needed at application launch can potentially put this contractual obligation at risk.

In these large installations, it is thus beneficial to avoid or minimize large spikes or dramatic changes in power consumption for at least the reasons outlined above. Given the large number of devices included in these installations however, this control requires consideration of the collective operating power demands for all components involved.

Generally, there are at least three spans of an application life cycle that can present possibilities for undesired spikes in power—launch, runtime and exit. At application launch, the target node set can go from minimal power consumption to maximal power consumption over a very short period of time. As suggested above, application runtime is a second possible portion of the application lifecycle where undesired power spikes can occur. For example, massive swings in power consumption can occur during synchronization, where constituent parts of the parallel applications often race towards synchronization barriers, and then wait for the rest of the application to catch up. After catching up, the application will then proceed, thus requiring some amount of power to carry out the required tasks. No work is being done at these synchronization barriers so minimal power is consumed. The rate at which the constituent parts of the application reach the barrier however, could be significant enough to cause power ramp rate issues. These issues are even more likely at the point in time when all parts reach the barrier and are released in unison. At this point power consumption can instantaneously jump from near minimum to near maximum.

Another possible runtime circumstance where power ramp rate issues (or undesirable abrupt power swings) may occur is when many parts of applications might stall waiting for blocking I/O. In this circumstance, once I/O is actuated, all operations can potentially proceed instantaneously. Again, the collective operation of many nodes carrying out this same process can create undesired power ramp rate issues.

Additional runtime circumstances or conditions exist which also have the potential to create concerns. Some of these may include cases where a debugger is in use, processes utilizing breakpoints, single stepping execution, etc. In addition, there's nothing to prevent an application writer from voluntarily suspending parts of the application for whatever reason, at any point in time. This will obviously create potential ramp rate issues due to collective starting and stopping of application steps.

Again, application exit presents yet another potentially problematic situation, as the target node set goes from maximum power consumption to minimum power consumption. This is generally the third and last step in an application life cycle. In addition to the normal termination of an application, abnormal termination due to programmatic errors, system violations, or general system failures create identical concerns, and have the potential to create similar abrupt swings in power.

As the above situations and examples illustrate, there are several possible operations that can create undesired spikes or abrupt transitions in the overall power being supplied to large scale computing systems. Again, the effect of these operations or activities when considered individually may not create issues or concerns. When the collective effects are considered however, the power related concerns are greatly amplified during operation of a large scale computing system.

SUMMARY

To avoid undesirable power conditions caused by various applications and operating conditions, a ramp rate control tool is provided which will provide oversight and general coordination of processes, in a manner which will avoid undesirable effects. In one embodiment, an application supervisory system will control the specific processor transitions initiated by various applications, thus avoiding undesirable power transitions. Generally speaking, these tools will control the various states in which the processors themselves are operating during the various system operations or transitions, thus also controlling the overall power consumption. By providing this control capability, the possibility of power spikes and undesirable power usage conditions can be avoided, while also avoiding significant negative impacts on system operation.

DESCRIPTION OF THE PREFERRED EMBODIMENTS

Figure 1:
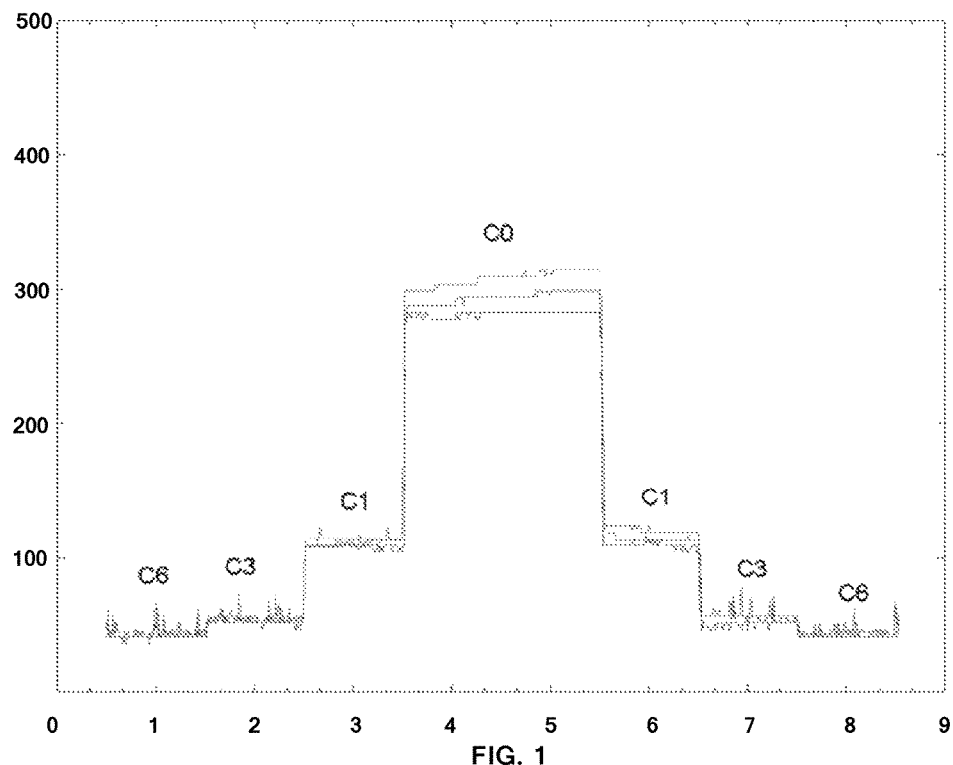
FIG. 1 is a graphical illustration of power consumption for a collection of discrete nodes during a job run using stepped power transitions.

Large scale systems, having multiple nodes and hundreds of thousands of processors, can easily experience several power consumption issues which may not be readily apparent. As with many circumstances, when the operations of various system components are considered individually, it may not appear that potential power consumption issues would exist. However, when a large number of components are involved, the collective operational affects can create significant undesired effects. In the case of large scale computing systems for example, the individual operations of multiple processors can have collective effects which are potentially undesirable.

With the above referenced situations in mind, it is desirable to provide tools which allow the computing systems to manage these situations, thus avoiding large scale power swings and undesirables spikes in power consumption. It is anticipated that these tools will be available to the various system users, allowing each user to implement or use the tools in a manner best fitting their needs, while also taking into account overall power consumption concerns. As further outlined below, the tools provided conveniently meet these needs, allowing users to implement the power consumption related methodologies which will avoid undesirable and unnecessary overall spikes in system power.

As known to those skilled in the art, processors have the ability to be placed in various operating states, with differing amounts of power being consumed when in these various states. Processor-operating states, or processor C-States, are typically power states that define the degree to which the processor is "sleeping". In one example, state C0 indicates normal operation conditions, where instructions are being executed. All other C-States (e.g. C1, C3, C6, and C7) indicate deeper sleep states, with more of the processor complex being powered down. Deeper C-States save more power but have longer exit latencies (i.e. the time required to transition back to C0 and to execute code). If the current workload is shallow, the processor will be found in the lower C-States more frequently and for greater durations. An idle processor can typically be found in the deepest C-State (e.g. C6 or C7 in some processors).

It is noted that processors from various manufacturers may utilize different nomenclature to indicate the various sleep states available. In the discussion herein, an example processor is referred to which has sleep states (or operating states) of C0 (fully operational) to C6 (its deepest sleep state). Those skilled in the art will recognize that several alternatives and variations are possible. For example, certain manufacturers may have ten sleep states with the references utilized being 0 to 9. In a similar manner, other manufacturers may utilize only four sleep states. As will be outlined in the discussion below, these various configurations are easily dealt with utilizing the tools provided. That said, the discussion below assumes utilization of a processor having C-States extending from C0 to C6.

Idle compute nodes will generally be found with their processors in state C6 just prior to application launch. Upon launch, all compute nodes suddenly have work to do and their processors jump immediately from state C6 to state C0 in near unison. Likewise, when an application exits or becomes idle during run-time, the processors involved drop from state C0 to state C6. The presented application ramp rate control methods and tools provide the ability to create a slow controlled ascent from state C6 to state C0 prior to application launch, and a slow controlled descent from state C0 to state C6 after the application terminates. Instead of the near binary C0/C6 transitions, the processor will spend a pre-defined period of time in at least one intermediate C-State. Spaced out in this manner, the system can shape the power consumption over time to create a smooth transition rather than a sharp jump.

Part of the overall power management process includes a set of tools used to limit power transition ramp rates. As another feature, the system may also configure the processors to limit the deepest C-State that can be utilized when idle. Further, to avoid spikes during run-time, the C-State limit can be pinned at or near C0 so that if an application does become idle for whatever reason, the lower C-States won't be entered (so long as this setting is maintained). This has the effect of limiting spikes, while also avoiding latency issues. Admittedly, additional amounts of power will be used by this approach, but the benefits relative to power spikes will justify this fact.

In systems large enough to generate or experience the issues described above, the ramp rate control tools may not necessarily be applied in all circumstances. For example, if an application is small enough, its ramp rate may not need to be managed if it poses no ramp rate issues for the system as a whole. Thus, the user will have the ability to tailor the application of the ramp rate control tools.

In addition to the C-State control generally mentioned above, ramp rates can also be controlled with intelligent batch scheduling and the use of artificial workloads. Leveraging all these approaches or tactics together requires a greater global system awareness than is possible at the compute node level. Thus, in one embodiment workload managers (WLMs) will coordinate the implementation of all general ramp rate control processes, along with any additional techniques utilized. Since WLMs already interface with several system tools, the present system will easily be able to expose this new set of C-State controls to WLMs via new functionality.

Generally, WLMs have no insight into the contents of batch jobs, thus they will only control C-States at the boundary of the job and not actually at the boundary of each application within the job. For ease of understanding, the example situation described below will assume that a job has a single application and will only refer to the application when necessary to understand the related processes. It should be understood however, that even though the tools of the various embodiments discussed herein will be applied by WLMs at the boundary of a job, this will not create a practical difference in operation throughout the job, since it is contemplated that the C-State for each processor will be pinned at or near C0 between applications within the job.

As mentioned above, the tools utilized to minimize power ramp rate issues can be varied depending on the needs of the particular application. That said, FIGS. 1-4 illustrate graphically the approach of various embodiments. Naturally, variations in the specific details are possible.

Referring now to FIG. 1, the power consumption of a system in which one embodiment of the ramp rate control tools has been utilized, is graphically illustrated. In this particular embodiment, the processor C-States are varied in three separate steps from C6, to C3, to C1 to C0. After each transition, the nodes are controlled to sleep or hold at that state for 60 seconds prior to the next transition. The illustration of FIG. 1 generally represents the result of overall power for each node, when a hundred nodes were operated utilizing methodology involving the above discussed stepped transitions. In particular, this figure illustrates the power consumption for three particular nodes, as the above mentioned methodologies are carried out. As can be generally concluded from this figure, the transition from state C6 to state C3, in both directions, resulted in a change of power consumption of roughly 10 watts. Similarly, the transition from C3 to C1 resulted in a power transition of approximately 55 watts. Lastly, the transition from C1 to C0 created a transition of approximately 180 watts. As can be seen, each of these transitions were nearly instantaneous. The complete transition from C6 to C0 was slowed over a period of time, however, which is a beneficial effect. That said, the instantaneous transition between C1 and C0 (180 watts) could create concerns for certain systems which have many processors making this transition at one time.

Figure 2:
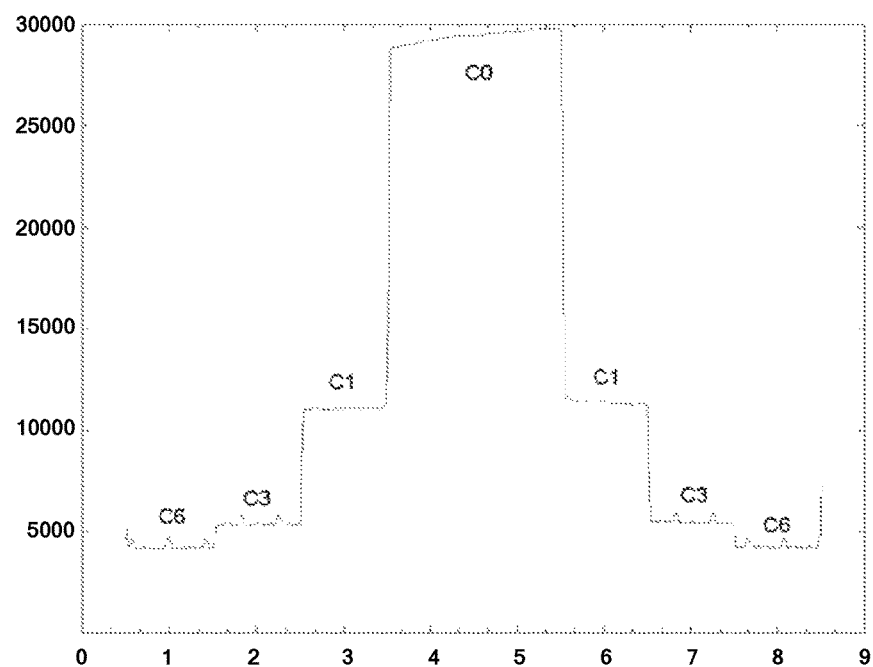
FIG. 2 is another graphical illustration of the cumulative power consumption for all nodes using the same stepped transitions illustrated in FIG. 1.

To further illustrate the effects of the above mentioned power transition methodologies, FIG. 2 illustrates the total power consumption across 100 nodes when the above mentioned stepped power transitions are utilized. As can be seen, the transition from state C1 to state C0 results in a ramp rate of roughly 18 kilowatts per minute. If this was further extrapolated to a large scale system having as many as 38,400 compute nodes (e.g. a viable 200 cabinet machine), the overall instantaneous power transitions become significant. Further, utilizing this same extrapolation, it was found that the transition from state C6 to C3 resulted in an approximately 384 kilowatt change. Similarly, the transition from C3 to C1 was approximately 2.1 megawatts, and lastly the transition from C1 to C0 was approximately 6.9 megawatts. This approach clearly created more staggered transitions; however the sharp change in power during transition from C1 to C0, still creates a concern.

Figure 3:
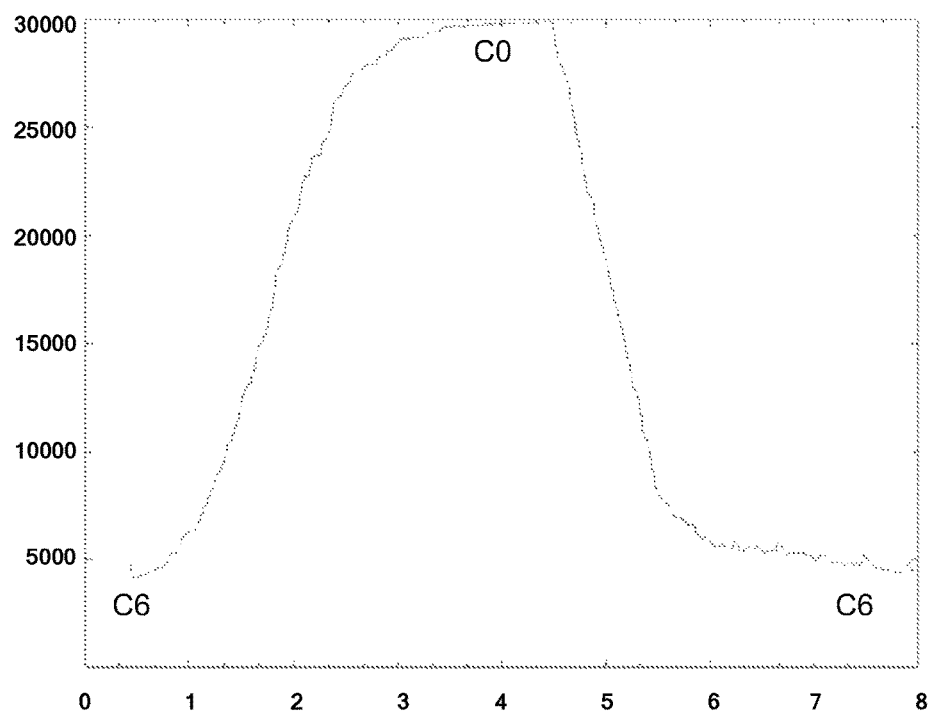
FIG. 3 is a graphical illustration of an alternate timing scheme.

To further address the remaining significant transition, it has been found that a similar stepped transition can be utilized, while having the sleep or hold periods randomly dispersed amongst the various nodes. Stated differently, random sleep or hold times between the transitions are utilized for all of the nodes, as opposed to the constant 60 second sleep time discussed above. Using this approach, the next step or transition for each node will occur at a random time following the previous transition, thus avoiding simultaneous transitions of all nodes. In one example embodiment, these random time periods will range from 0-60 seconds, thus resulting in a very different power curve when the nodes are brought up at the start of a job. Referring now to FIG. 3, the overall power consumption is illustrated when the above outlined node power transition methodology is incorporated. More specifically, the above mentioned 0-60 second random sleep or hold times prior to the next transition is utilized. As illustrated in FIG. 3, the stepped transitions are no longer present and a sloped power transition is achieved.

Figure 4:
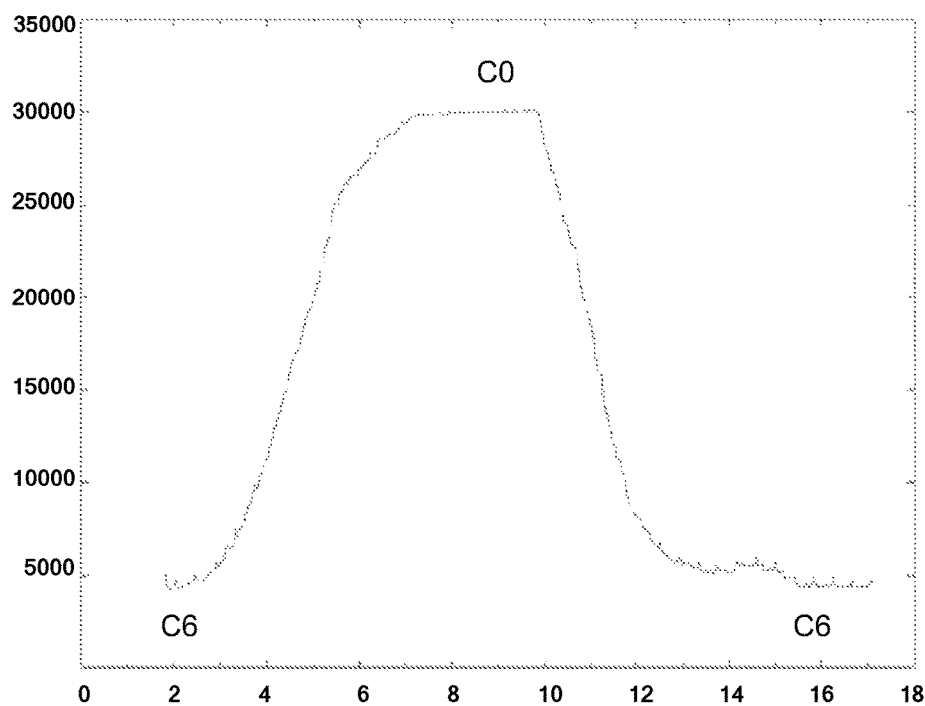
FIG. 4 is a graphical illustration of yet another alternative timing scheme.

To further spread the transition and "soften" the power change, the system illustrated in FIG. 4 utilizes a randomized sleep or hold period between 0-120 seconds. As above, the processors will sleep or hold at a particular or a random time period between 0 and 120 seconds before the next transition is made. (When comparing FIGS. 3 and 4, it is important to note that the time scale in FIG. 4 is double that of FIG. 3. The system of FIG. 3 will move from approximately 5 kilowatts to 30 kilowatts in approximately 2.5 minutes, whereas the system of FIG. 4 will require 5 to 5.5 minutes to make this transition.) As illustrated, this creates an even smoother transition between sleep state and full power state.

As the illustrations of FIGS. 1-4 show, the use of stepped transitions and/or randomized sleep or hold times will create a dramatic impact on overall power consumption during processor state transitions. Clearly, the use of stepped transitions and randomized sleep or hold times creates a much more acceptable power transition, and avoids any possibility of drastic jumps in system power. Further, the number of steps utilized and the sleep or hold time periods used could be chosen or modified as desired for any particular system, which will result in different power transition curves. Additionally, it is contemplated that the steps, timing or number of transitions in the ramp-up versus ramp-down phases could be altered or modified to create the specific effect desired. Clearly, several portions of this transition methodology can be modified or tuned to meet the needs of a particular installation.

In an alternative embodiment, a method to control C-States is provided which makes use of modulated transitions. Rather than utilizing chaos theory by randomizing the sleep time between transitions in the linear ramp up (C6-> C3->C1->C0), the WLM could instead modulate between C-States at increasing rates towards a full blown pinned C0 state. For example the transition between the final two C-States (i.e. state C1 and C0) could include the following modulation:

1) Hold at C1 for 30 seconds;
2) Move to C0 for 5 seconds;
3) Back to C1 for 25 seconds;
4) Up to C0 for 10 seconds;
5) Back to C1 for 20 seconds;
6) Up to C0 for 15 seconds; and
7) Back to C1 for 15 seconds;
8) Return to C0 for 20 seconds;
9) Back to C1 for 10 seconds;
10) Transition to C0 for 25 seconds;
11) Back to C1 for 5 seconds; and
12) Full transition to C0.

Naturally, this same approach could be used for any or all of the selected state transitions. Further, the time periods or number of steps used could also be easily changed. In yet another embodiment, a hybrid approach could also be used (i.e., partial random sleeps/partial modulation). Alternatively, a particular subset of the nodes could be targeted with any of the above mentioned approaches.

Figure 5:
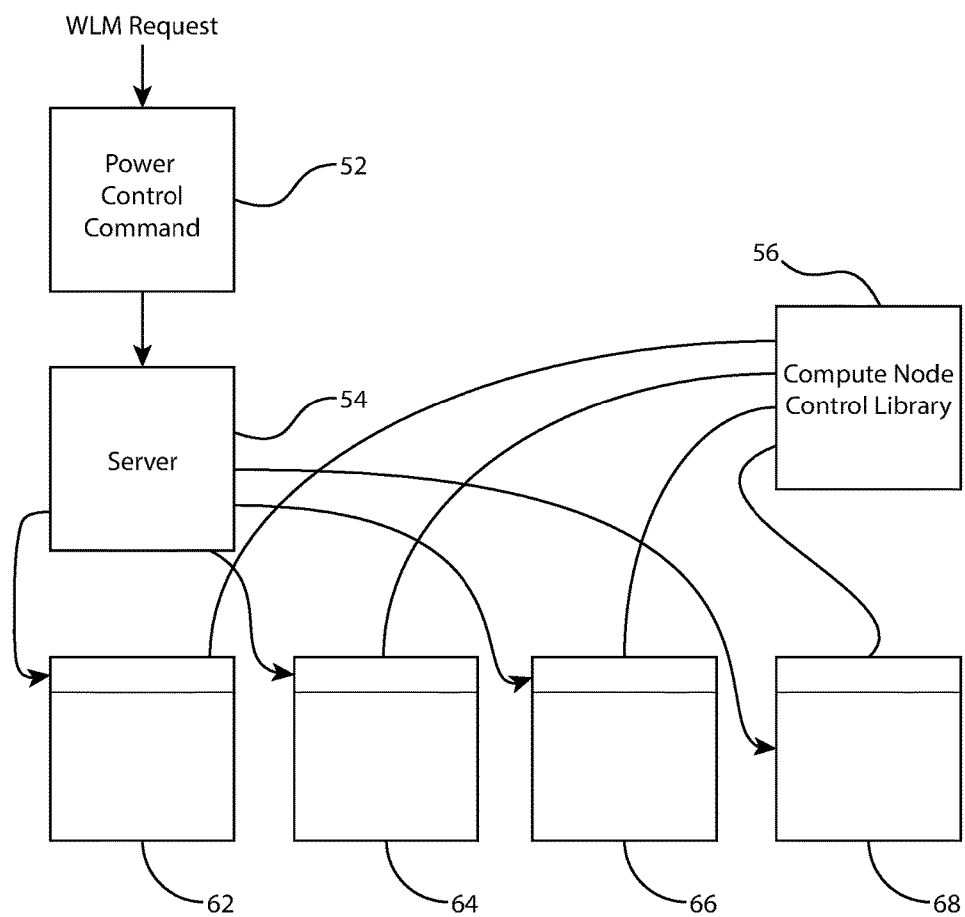
FIG. 5 is a block diagram graphically illustrating the creation of a library for distribution of command files, and the method used for appropriate placement of command lines.

To apply the particular approaches outlined above, one embodiment will allow the WLMs to set sleep state limits by executing a power control command with an appropriate command line. The power control command will then authenticate the request and send it on to an appropriate server (e.g. an HTTP server) provisioned to handle it. The server will in turn construct a power request to fan out the request to all of the compute nodes. In order to fan out the request, the server may need to be specifically provisioned on a service node. This general distribution of commands for this particular embodiment is generally illustrated in FIG. 5. Naturally, several variations are possible. Referring to FIG. 5, a power control command 52 will be generated in response to the WLM issuing an appropriate request. As mentioned above, this command is then passed along to a server 54, assigned to handle further coordination and overall control for several compute nodes. As generally illustrated in FIG. 5, server 54 will construct the power command line which will then fan out to the various compute nodes 62, 64, 66, 68.

On the various compute nodes (62, 64, 66, 68), the incoming request will execute a compute node control command. In this embodiment, the compute node control command is executed in privileged mode so that any privileged access requirements are satisfied. It is assumed that the power control command has previously gone through the appropriate authentication process, and that the server launched the power command line such that it runs with sufficient privileges on the target compute nodes.

The compute node control command provides the basic facility for node control to implement the ramp rate control tools outlined above. The compute node control command in this embodiment links against a library conceptually illustrated in FIG. 5 as item 56. Pushing this functionality into a new library also allows application input into sleep state limiting at run time by appropriately linking against the library. More specifically, linking to this library allows for convenient alteration to meet the specific needs and characteristics of the processors involved.

The discussion above refers to various sleep states by using a "C0", "C1", "C2". . . designation. To provide additional flexibility, the tools provided in the various embodiments may accept as input a very abstracted set of sleep state handles such as 0, 1, 2, and 3 (where 0=C0, 1=C1, 2=C3 and 3=C6). Other alternative abstractions could be used depending on the naming conventions used. For example, an alternative approach may use the designations NO (i.e. no sleeping), SHALLOW, MEDIUM, DEEP, and DEEPEST. As will be appreciated, this can be coordinated using the above mentioned library, which can map specific values or commands appropriate for the various processors. In this manner, modifications for different processor can be easily managed without the need for specific tailoring to meet the specific characteristics of each particular system.

As pointed out earlier, there may still be ramp issues while the processor is pinned to C0. To find the actual peak power consumption under heavy load while pinned to C0, a calculation for one exemplary system having 100 nodes was carried out. More specifically, experimental data for one exemplary system was used, where the peak consumption per node was generally averaged at approximately 407 W. The average peak consumption previously measured when idle in C0 was ~290 W. This provides a delta of 117 W between an idle system pinned at C0 and one pinned to C0 during operation. On our theoretical 200 cabinet system, this equates to a ramp of up to 4.9 MW at any time an operation is carried out by the system as a whole. To deal with this situation, it is also possible to utilize dynamic voltage and frequency scaling, or dynamic frequency scaling, (also referred to as management of processor P-States or Performance states), thus further varying the overall power consumed by the system during transitions. In one embodiment this is carried out by an override function.

In yet another approach, the present system will limit the use of turbo mode in various processors to further limit power consumption and ramp rates. In an approach similar to the above override related to P-States, operation in the turbo mode can be limited. This typically will occur at boot time, but could also be implemented at run time or application and/or job launch time.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A method for managing power within a computing system having a plurality of processors, comprising:

providing controls to the system which allow for control of the plurality of processors prior to a plurality of predetermined processing operations; and upon a request for any one of the plurality of predetermined processing operations, instructing the plurality of processors such that each processor will transition between a plurality of power states in a predetermined manner prior to execution of any one of the plurality of predetermined processing operations thus avoiding an abrupt power transition within the computing system, wherein the predetermined manner involves moving from a first power state to a second power state and staying at the second power state for a predetermined period of time, subsequently moving from the second power state to a third power state after the predetermined period of time has elapsed, and, after staying at the third power state for a second predetermined period, subsequently moving to a fourth power state which is greater than the third power state.

2. The method of claim 1 wherein the predetermined period of time is constant for each of the plurality of processors.

3. The method of claim 1 wherein the predetermined period of time is randomly distriburted, within a defined ranged, for each of the plurality of processors.

4. The method of claim 1 wherein each of the plurality of processors will stay at the first power state for an initial period of time prior to transition to the second power state.

5. The method of claim 1 or 4 wherein predetermined period of time and the second predetermined period of time are both constant time periods.

6. The method of claim 1 or 4 wherein the predetermined period of time and the second predetermined period of time for each of the plurality of processors are randomly selected from within a defined range of time periods.

7. The method of claim 6 wherein the predetermined period of time is a randomly selected from within a defined range of time periods.

8. The method of claim 1 wherein the plurality of processors are contained within a plurality of compute nodes, and a power control command is distributed to the compute nodes which will then control operation of each of the processors so that each will stay at the second power level for the second period of time.

9. The method of claim 8 wherein the period of time is altered by modifying the power control command as needed.

10. The method of claim 1 further comprising adjusting a processor P-State when the processor is at any one of the first power state, the second power state or the third power state.

11. A method of controlling the power consumption in a large scale computing system having a plurality of compute nodes with each compute node having a plurality of processors, the method comprising:

distributing a power control command to the plurality of compute nodes which is capable of controlling the operation status of the plurality of processors such that each of the plurality of processors follow a power transition profile in response to a request and prior to each of the plurality of processor carrying out a compute operation;

wherein the power transition profile involves each processor transitioning between a first power state, a second power, state, a third power state and a forth power state in a manner that causes the processor to stay at the second power state for a first predetermined period of time before moving to the third power state and causing the processor to stay at the third power state for a second predetermined period of time before moving to the forth power state.

12. The method of claim 11 wherein the first predetermined period of time and the second predetermined period of time are fixed periods of time.

13. The method of claim 11 wherein the first predetermined period of time and the second predetermined period of time are randomly selected time periods within a range such that the time periods for the plurality of processors when transitioning to the subsequent power state is randomly distributed within the range.

14. The method of claim 11 wherein the first power state is a zero power state and the forth power state is a full power state, and wherein second power state and the third power state are intermediate power states between the first power state and the second power state.

15. The method of claim 14 wherein the first period of time and second period of time are fixed periods.

16. The method of claim 15 wherein the randomly selected time period for each processor is randomly selected with a defined range.

17. The method of claim 14 wherein the first period of time and the second period or time are a randomly selected time periods, such that each power transition for each of the plurality of power transitions is randomly distributed.

18. The method of claim 11, wherein the power transition profile further causes the processor to vary a processor P-State while at the intermediate power state or the subsequent power state.

* * * * *